United States Patent
Wilson et al.

(10) Patent No.: US 6,669,000 B2
(45) Date of Patent: Dec. 30, 2003

(54) AUTOMATED METAL REMOVAL SYSTEM FOR CONVEYOR BELTS

(76) Inventors: William A. Wilson, 83 Pheasant Dr., Marietta, GA (US) 30067; A. Joseph Tulkoff, 1225 Meadowmist Way, Marietta, GA (US) 30064

( * ) Notice: Subject to any disclaimer, the term of this patent is extended or adjusted under 35 U.S.C. 154(b) by 13 days.

(21) Appl. No.: 10/095,815

(22) Filed: Mar. 12, 2002

(65) Prior Publication Data

US 2002/0125102 A1 Sep. 12, 2002

Related U.S. Application Data

(60) Provisional application No. 60/274,921, filed on Mar. 12, 2001.

(51) Int. Cl.[7] .......................... B65G 37/00; B65G 47/10; B65G 47/46; B65G 47/74
(52) U.S. Cl. .......................... 198/367; 198/636; 198/637
(58) Field of Search ............................ 198/364, 367, 198/636, 637, 841; 209/657, 707, 922

(56) References Cited

U.S. PATENT DOCUMENTS

| | | | | |
|---|---|---|---|---|
| 2,537,005 A | * | 1/1951 | Brown et al. ................ | 198/367 |
| 3,590,983 A | * | 7/1971 | Oury ........................... | 198/637 |
| 4,213,525 A | * | 7/1980 | Scheppele ................... | 198/364 |
| 4,930,625 A | * | 6/1990 | Wilson ........................ | 198/839 |
| 5,351,802 A | * | 10/1994 | Wilson ....................... | 198/367 |

* cited by examiner

Primary Examiner—Gene O. Crawford
(74) Attorney, Agent, or Firm—Harry I. Leon; Vivian L. Steadman

(57) ABSTRACT

A system which utilizes a scraper blade, set at an angle to longitudinal centerline of a conveyor belt, to remove metal objects therefrom, the belt, under normal operating conditions, being supported in a trough-like configuration. Attached to the backside of the blade is a pair of high density plastic press-down feet. They protrude downwardly a short distance below the lower edge of the scraper blade; and each press-down foot, immediately prior to belt flattening, is disposed above a part of the trough-shaped belt which situated just inside one of its outer edges. Making contact with the belt slightly ahead of the scraper blade, the press-down feet flatten the belt, protecting it as the blade is being lowered. Any contact between the belt and the blade occurs along its lower edge which is covered by a high density rubber guard beneath which the belt can slip. Similarly, beneath the belt are mounted flat, elongated strips made of a high density plastic. Disposed generally parallel to the centerline of the belt, these strips support its mid-section but leave those portions of the belt contacted by the press-down feet, as well as an outer edge of the belt proximate with the strips, unsupported. The flattened belt is able to slip beneath the plastic press-down feet and across the plastic strips while the scraper blade diverts metal-contaminated bulk material across this unsupported outer edge without stopping or damaging the belt. The blade is counterbalanced by a weight which not only allows it to be raised more easily but also prevents it from falling onto the belt during loss of operating air pressure.

8 Claims, 4 Drawing Sheets

AUTOMATED METAL REMOVAL SYSTEM FOR CONVEYOR BELTS

CROSS REFERENCE TO RELATED U.S. PATENT APPLICATION

This application includes subject matter disclosed in copending provisional U.S. patent application Ser. No. 60/274,921, filed Mar. 12, 2001.

BACKGROUND OF THE INVENTION

A mechanism for removing metallic objects from a moving conveyor belt without stopping it was disclosed by Wilson in U.S. Pat. No. 5,351,802, issued Oct. 4, 1994. In this apparatus, a metal detector, which is positioned upstream of a dumping station, senses the presence of a metallic object such as tramp metal travelling on the belt. A signal from the metal detector then triggers a computer counter. Preprogrammed for compatibility with the speed of the conveyor belt, the counter allows the detected metallic object to move, undisturbed, to a point proximate with the entrance to the dumping station. Upon the metal object's reaching this entrance, a control unit activates a scraper blade—which is otherwise held above the conveyor belt, and the blade is lowered until it is near or just above the belt. Simultaneously, an array of horizontally disposed idlers, stored beneath the belt, is raised upwardly, flattening it. The idlers are positioned in a pattern such that when they are in contact with the belt, only a portion of it is supported. An unsupported part of the belt to one side of idlers forms a soft spot. With this combination, the blade can be used to direct the metal object, as well as a relatively small amount of the overburden containing it, off of the belt. This mechanism has been put into practice and is working well. However, many of its components must be field installed and customized to each individual conveyor belt.

SUMMARY OF THE INVENTION

The primary object of the present invention is to provide an improved mechanism for removing metallic objects from a moving conveyor belt without stopping it, which can be factory assembled, with only a minimum amount of field work being required to install it on a particular conveyor belt.

A further object is to provide a relatively simple mechanism for removing both ferrous and non-ferrous metallic objects from a continuously moving conveyor belt, thereby lowering both factory and installed costs.

A still further object to provide a system which utilizes a scraper blade for removing relatively small quantities of the total flow of bulk materials transported on a conveyor belt, which, under normal operating conditions, is supported in a trough-like configuration.

In accordance with the present invention, there is provided an improved metal removal system, identified herein by the acronym "MARS" (for Metal Automated Removal System), for directing one or more metallic objects, as well as a bulk material contaminated with them, off of a moving conveyor belt. In the MARS system, instead of raising an array of idlers in order to flatten the belt, as is taught in U.S. Pat. No. 5,351,802, the scraper blade itself and a pair of press-down feet mounted on the distal ends thereof are used. So that the belt is protected during the flattening process, the press-down feet protrude downwardly a short distance below the lower edge of the scraper blade and each press-down foot, while the belt is supported in its normal trough-like configuration, is disposed above a part of the belt which is situated just inside one of its outer edges. In addition, not only are the press-down feet fabricated of high density plastic but also the lower edge of the scraper blade is covered with a high density rubber guard. Moreover, where the belt is pushed flat by the blade and press-down feet, it slides across a plurality of elongated high density plastic strips which act as bearing surfaces. Disposed generally parallel to the centerline of the conveyor belt, these strips leave those portions of the belt contacted by the press-down feet, as well as an outer edge of the belt proximate with the strips, unsupported. In use, the flattened belt slips beneath the plastic press-down feet and between the rubber guard and the plastic strips while the lowered scraper blade diverts, via a soft spot which forms to one side of the strips, metal-contaminated bulk material away from the belt.

The improved metal removal system also includes a counterweight mounted on the distal ends of support arms for the scraper blade. The counterweight not only allows the scraper blade to be raised more easily than would otherwise be practicable but also it prevents the scraper blade from falling onto the belt during loss of operating air pressure.

DETAILED DESCRIPTION OF THE PREFERRED EMBODIMENT

Figure 1:
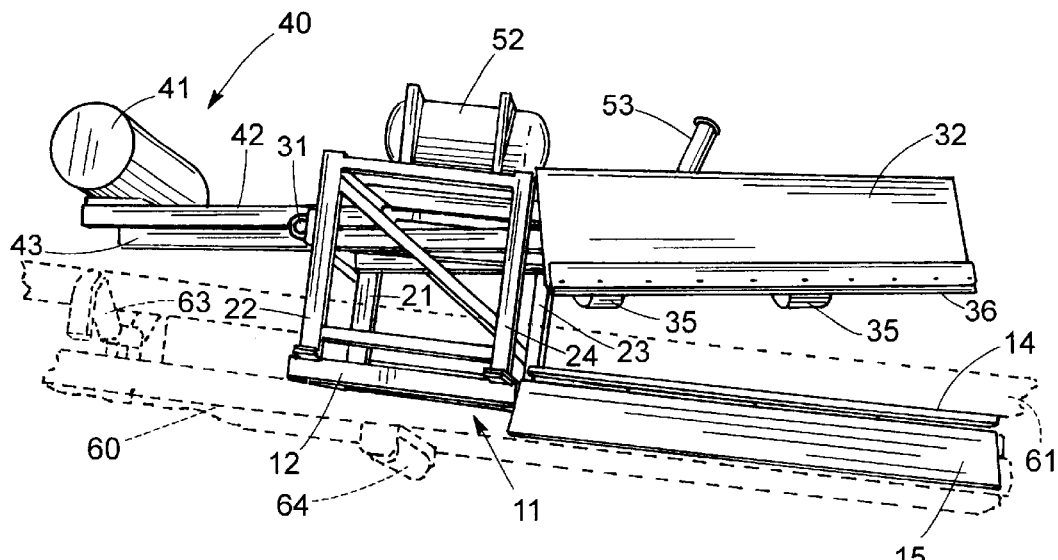
FIG. 1 is a lower, right side perspective view of the metal removal system according to the present invention installed on a conveyor belt, with the scraper blade of the system being shown in the raised position and a fender which protrudes laterally therefrom being removed for clarity of illustration; the conveyor belt, rollers and related support structure being shown in dashed lines and forming no part of the invention.

In the drawings, a MARS system is indicated generally by the reference numeral 10. Within this system are five subassemblies: a lower frame assembly 11, an upper frame assembly 20, a scraper blade assembly 30, a counterweight assembly 40, and a control assembly, including a metal detector 71. The five subassemblies together weigh, by way of example, about 2500 pounds and can be easily transported on a flat bed truck.

Capable of automatically removing any metal that a metal detector can sense and custom designed to operate safely with all belt widths and speeds, conveying any type of loose bulk material, the MARS system 10 is preferably installed on a pre-existing conveyor support frame 60 as a package. This package can be mounted anywhere on the frame 60 as long as there is sufficient distance between the metal detector 71 and the site selected as the dumping station. This distance depends upon the belt speed, since a minimum response time of about 1/10th minute is needed between the detection of a metal and the time the bulk material reaches the dumping station. For example, if the belt speed is 100 feet per minute, then only 10 feet is required between the detector 71 and the dumping station; but for a high speed belt travelling at 1000 feet per minute, the recommended distance is about 100 feet.

At the site of a MARS installation, three or four troughing idlers 63 (as described in U.S. Pat. No. 5,351,802, for example) may need to be removed from the conveyor to make room for the lower frame assembly 11; and one or more of these idlers may need to be re-installed once the assembly 11 is in place. Moreover, the conveyor support frame 60 itself may also need to be slightly modified to carry additional weight to accommodate the system 10; and the catwalk altered so that bulk material 62 can be safely discharged from the conveyor belt 61. Once the lower frame assembly 11, including its mounting base 12, has been rigidly attached by bolts or welding to the top of the conveyor support structure 60, the upper frame assembly 20 is then bolted to the base. To complete the installation, the user next connects a compressed air supply and electric power to the system 10; and finally, the control assembly is connected to the scraper blade assembly 30. Typically, the package can be user installed in less than one day.

The system 10 works in conjunction with both existing and new metal detectors. When the detector 71 senses tramp metal in the loose material 62 on the belt 61, it sends a signal to the MARS computer. The computer then processes the signal; and when the material 62 approaches the dumping station, the control assembly activates the scraper blade assembly 30, automatically lowering a scraper blade 32. Disposed at an angle to the longitudinal centerline of the belt 61, the scraper blade 32, with the assistance of press-down feet 35, flattens the belt against underlying high density plastic bearing strips 14. Metal-contaminated bulk material is then diverted to an unsupported side of the belt 61 causing it to sag. Once the tramp metal has been discharged, the computer sends a signal to the scraper blade assembly 30 which causes it to raise the scraper blade 32, restoring normal material flow along the belt 62.

The entire dumping process takes only a few seconds, and a relatively small amount of bulk material 62 is dumped with each piece of tramp metal. For example, in the case of a belt 61 carrying bulk material 62 at the rate of 1000 tons per hour, less than one-half ton would be discharged during a typical discharge cycle. Moreover, if a second piece of metal is detected close to the first piece or if a cluster of tramp metal is detected, the computerized control assembly 70 will automatically determine how long the scraper blade 32 must stay down in order to discharge all of the metal from the belt 62.

Figure 2:
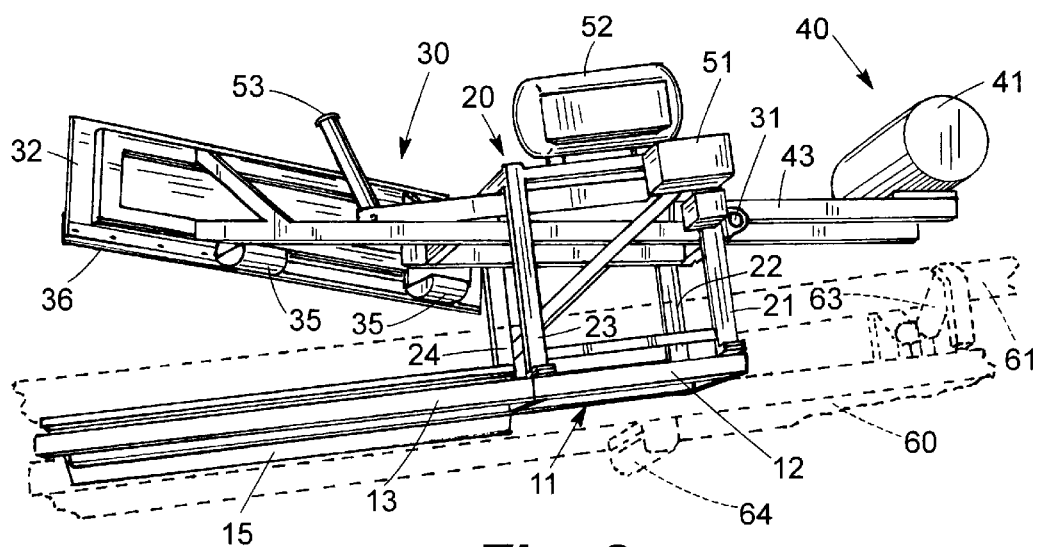
FIG. 2 is a lower, left side perspective view of the metal removal system according to FIG. 1.
Figure 3:
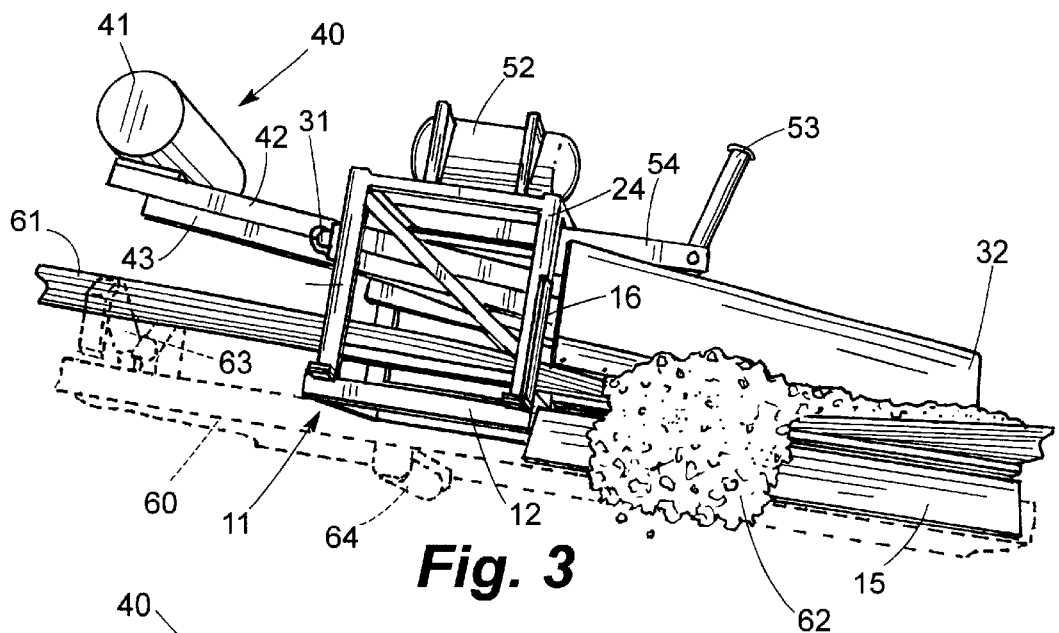
FIG. 3 is a lower, right side perspective view of the metal removal system according to FIG. 1, including the fender which protrudes laterally from this system; its scraper blade being shown in the lowered position and dumping bulk material from the conveyor belt.

As illustrated in FIGS. 1 through 4, the lower frame assembly 11 comprises a mounting base 12 which is rigidly attached to the conveyor support frame 60, a bearing support frame 13, and high density plastic bearing strips 14. In the section of the conveyor support structure 60 on which the MARS system 10 is installed, the plastic bearing strips 14 take the place of horizontally disposed conveyor rollers (similar to rollers 64); and troughing rollers 63 are removed to create a "soft spot" in the belt 62, so that not only can it be more easily flattened but also to facilitate discharge of the metal-contaminated bulk material. Both a discharge chute 15 and a fender 16, attached to the lower and upper frame assemblies 11 and 20, respectively, help to guide bulk material 62 off of the conveyor belt 61 as it sags downwardly during the dumping sequence (FIG. 3).

Figure 4:
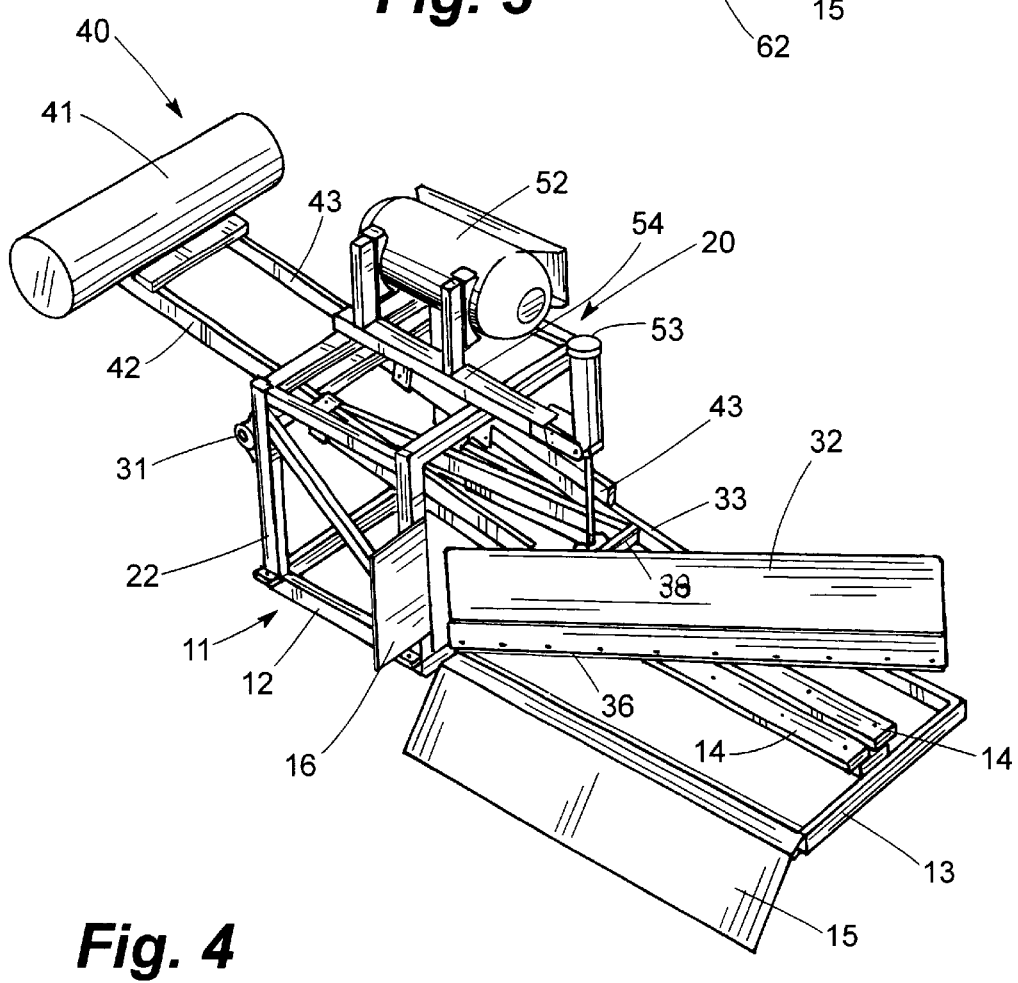
FIG. 4 is a top, right side perspective view of the metal removal system according to FIG. 1, the system being illustrated as a free-standing unit, rather than as one installed on a conveyor belt; the scraper blade being shown in the lowered position.
Figure 5:
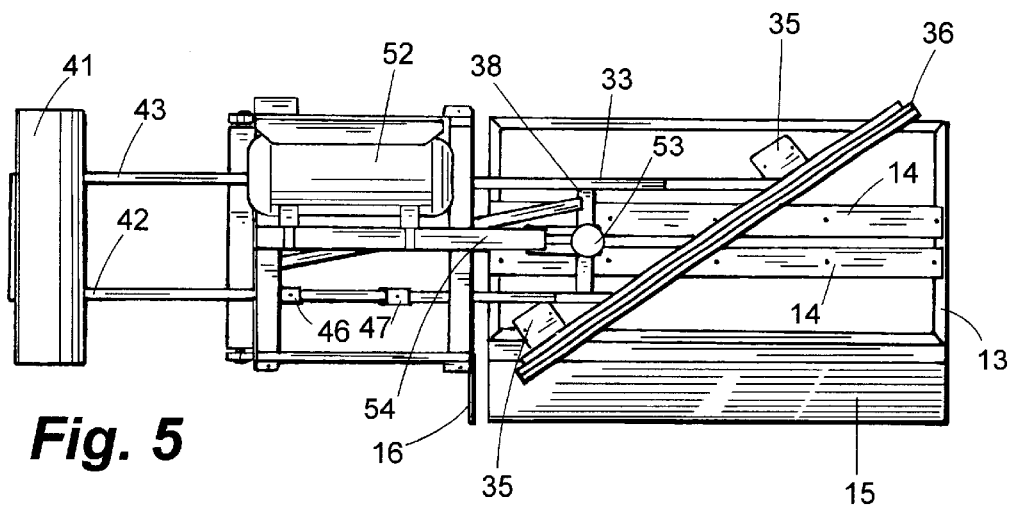
FIG. 5 is a top, plan view of the metal removal system according to FIG. 4.

Supported by a plurality of legs 21, 22, 23, 24, the upper frame assembly 20 is attached to a mounting base 12 which, together with a bearing strip support frame 13 comprises the lower frame assembly 11 (FIG. 4). A pair of bearing blocks mounted on the legs 21, 22 are used to rotatably mount the scraper blade assembly 30 on the upper frame assembly 20.

The blade assembly 30 includes an axle 31 whose ends rotate within the bearing blocks (FIGS. 1 through 4). Supported at an angle to the conveyor belt 61 by at least two composite support arms 33, 34 which are pivotally attached at one end to the axle 31 and the other end to the blade 32, the scraper blade 32 and a pair of high density plastic press-down feet 35 mounted on each of its distal ends are employed to push the mid-section of the belt and portions thereof proximate with its outer edges downwardly.

Protruding a short distance downwardly of the lower edge of the scraper blade 32, the press-down feet 35 make contact with the belt 61 slightly ahead of the blade and flatten the belt 61 sufficiently to protect its outer edges. Otherwise, the blade 32 would cut them saw-like as it was being lowered. In the preferred embodiment, each press-down foot 35 protrudes, by way of example, about ½ inch below the contiguous lower edge of the blade 32. Spacing between the press-down feet 35 is dependent upon the width of the belt 61.

Moreover, any contact between the belt 61 and the scraper blade 32 occurs along its lower edge which is covered by a high density rubber guard 36 beneath which the belt can slip. Preferably fabricated of an extremely tough rubber, such as that manufactured by Shell for use with snow plow blades, and capable of outwearing metal many times over under slippery conditions, the guard 36 further protects the belt 61 from damage. When bulk material 62 runs up against the scraper blade 32, set at an angle to the centerline of the belt 61, in combination with the plastic press-down feet 35 pushing down upon the otherwise trough-like sides of the belt 61 and with the rubber guard 36 flattening its mid-section, the bulk material is removed with little stress being exerted on the belt.

Figure 8:
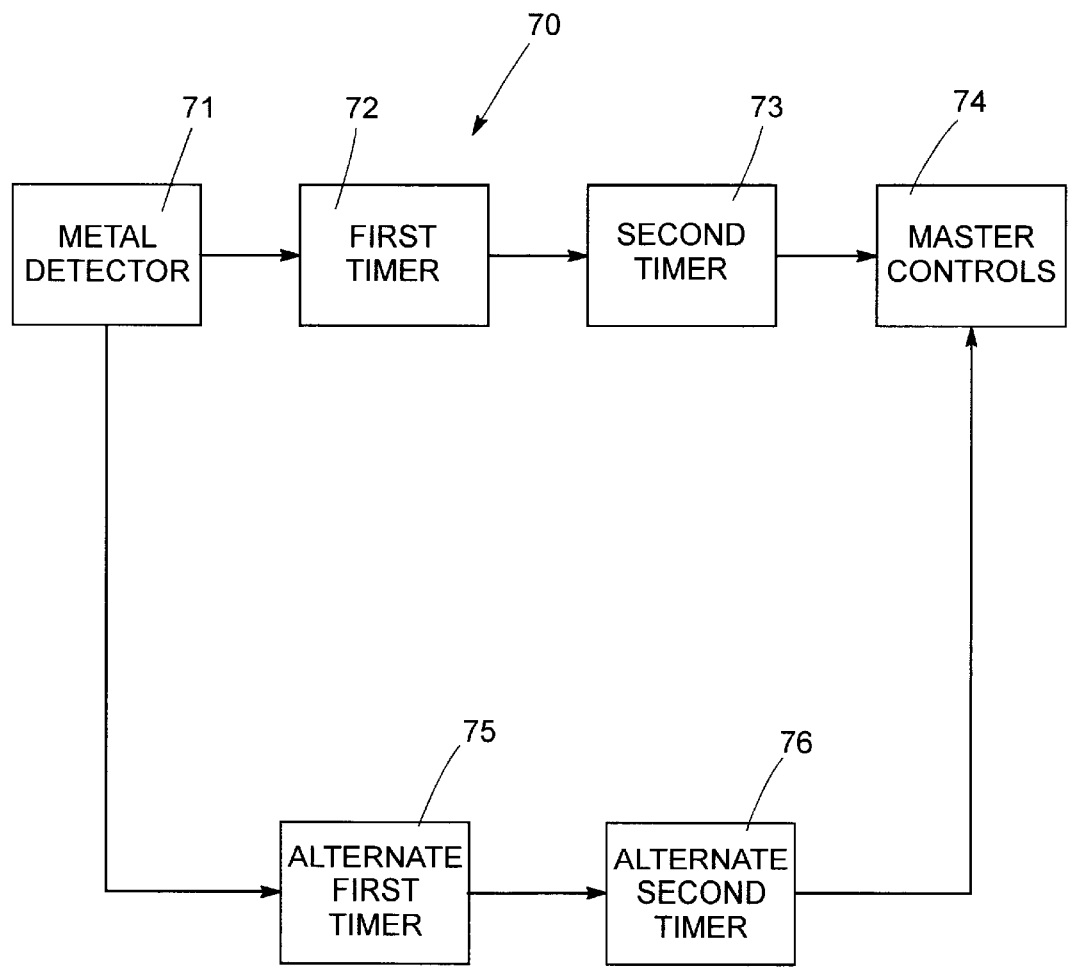
FIG. 8 is a block diagram of controls for the metal removal system according to the present invention.

The control assembly comprises a control circuit 70 shown schematically in FIG. 8. Except for a metal detector 71, the control circuit 70 is housed in an enclosure 51 mounted atop the upper frame assembly 20 (FIG. 2). Upon generating a signal indicating the presence of a metallic object, the detector 71 also activates a first timer 72. The first timer 72 delays activation of master controls 74 until the detected metallic object has moved proximate with the entrance to the dumping station. The first timer 72 then sends a signal to an alternate first timer 75 as the metallic object advances further towards this entrance.

Next the timer 75 proceeds to activate the master controls 74 for a time period corresponding roughly to the length of time required for the metallic object to move, on the belt 61, through the dumping station. The master controls 74 operate a valve which releases compressed air from a storage tank 52 to a pneumatic cylinder 53 which lowers the blade 32. When the timer 75 completes its cycle, this timer activates controls 74 which utilize compressed air to retract the cylinder 53.

Additional timer circuits 73, 76 are provided to keep track two or more metallic objects travelling in close proximity to each other on the belt 61 as well as to sound a horn or even shut down the belt 61 if a predetermined number of metallic objects are detected within a given time period.

For greatest flexibility of operation, a programmable controller is preferably employed, replacing the individual timers and timer circuits described hereinabove. Suitable models of programmable controllers and metal detectors for this application are disclosed in U.S. Pat. No. 5,351,802.

Figure 6:
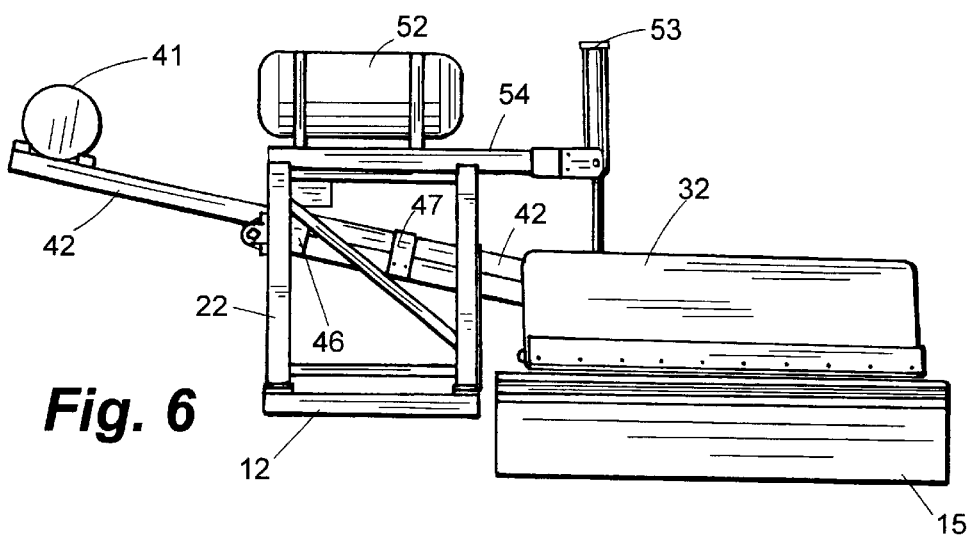
FIG. 6 is a right side elevational view of the metal removal system according to FIG. 4.
Figure 7:
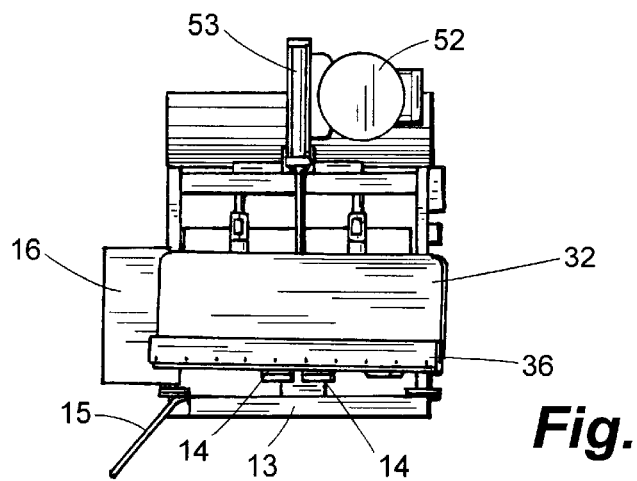
FIG. 7 is a front elevational view of the metal removal system according to FIG. 4.

As shown in FIG. 4, the cylinder 53 and its shaft are pivotally connected to a beam 54 and a cross member 38, respectively. The latter bridges the composite support arms 33, 34 near their joints with the scraper blade 32. Cantilevered over the belt 61 and extending generally parallel to its centerline, the beam 54 is disposed upwardly of the cross member 38 (FIGS. 4 and 6). A horizontally disposed upper frame member, rigidly connected to legs 23, 24 in the assembly 20, supports the beam 54.

Used to reduce the force required to raise the scraper blade 32 after metal-contaminated material has been discharged from the belt 61, the counterweight assembly 40 comprises a weighted tank 41 and support arms 42, 43 (FIGS. 1 through 7). The arms 42, 43 are longitudinal extensions of the composite support arms 33, 34, respectively, and rigidly attached thereto by straps 46, 47 (FIG. 6). The counterweight assembly 40 is also used to keep the scraper blade 32 in the raised position during a loss of air pressure to the cylinder 53.

In an alternate embodiment, a system, which lacks a metal detector 71 but is otherwise similar to the system 10, is used for removing a relatively small quantity of the total flow of bulk materials transported on a conveyor belt, which, under normal operating conditions, is supported in a trough-like configuration. In this system, a programmable controller sends a signal which activates the first timer 72, initiating a dumping sequence. The quantity of bulk materials discharged is determined by the setting of the timer 75, which controls how long the blade 32 contacts the belt 61 during each dumping sequence.

It is understood that those skilled in the art may conceive other applications, modifications and/or changes in the invention described above. Any such applications, modifications or changes which fall within the purview of the description are intended to be illustrative and not intended to be limitative.

It is claimed:

1. A system adapted for removing metal objects from bulk materials moving on a conveyor belt capable of assuming a trough-like configuration and having at least one outer edge, comprising:
   (a) a frame;
   (b) a platform having at least one flat, elongated, horizontally disposed high density plastic strip which is disposed generally parallel to the longitudinal centerline of the belt, the belt slipping across the strip when pressed there against, a section of the belt between said outer edge and the strip being unsupported;
   (c) at least one arm pivotally mounted on the frame;
   (d) a scraper blade rigidly attached to the arm, the scraper blade being disposed upwardly of said portion of the belt and having a lower edge; and
   (e) means attached to the frame for lowering the scraper blade so as to press the belt against said plastic strip; the unsupported section of the belt sagging, whenever bulk materials transported on the belt accumulate against the scraper blade, thereby facilitating removal of metal objects from the belt.

2. The system according to claim 1, which further comprises a high density rubber guard which covers the lower edge of the scraper blade, the belt slipping between the rubber guard and the plastic strip wherever the scraper blade presses the belt against the strip.

3. In a system adapted for removing metal objects from bulk materials moving on a conveyor belt capable of assuming a trough-like configuration and having at least one outer edge, which comprises a scraper blade, a counterweight, a pneumatic cylinder for effecting movement of the scraper blade into operative position, and at least one arm for rotatably supporting the scraper blade and the counterweight, the counterweight being mounted on the arm supporting the blade and disposed distal from the blade, the combination with said arm of a means, including the counterweight, for holding the scraper blade above the conveyor belt and any bulk materials moving thereon, during loss of air pressure to the pneumatic cylinder.

4. A system adapted for removing a small fraction of bulk materials moving on a conveyor belt, the belt being capable of assuming a trough-like configuration and having at least one outer edge, comprising:
   (a) a frame;
   (b) at least one arm pivotally mounted on the frame;
   (c) a scraper blade rigidly attached to the arm, the scraper blade being disposed upwardly of the belt and distal from the frame, the scraper blade having a lower edge;
   (d) means attached to the frame for lowering the scraper blade; and
   (e) means, which is attached to the scraper blade and disposed, immediately prior to lowering of the scraper blade, above a portion of the belt situated just inside said outer edge when the belt has assumed a trough-like configuration, for flattening said portion of the belt slightly ahead of the scraper blade, thereby protecting said outer edge as the blade is being lowered.

5. The system according to claim 4, which further comprises a counterweight mounted on the arm distal from the blade, so that the force required to raise the scraper blade and to hold up the scraper blade during loss of control is substantially reduced.

6. The system according to claim 4, wherein the flattening means comprises a pair of press-down feet attached to distal ends of the scraper blade, each press-down foot protruding downwardly a short distance below the lower edge of the scraper blade.

7. The system according to claim 4, which further comprises:
   (a) platform having at least one flat, elongated, horizontally disposed high density plastic strip which is disposed generally parallel to the longitudinal centerline of the belt, the belt slipping across the strip when the scraper blade is lowered sufficiently, a section of the belt between said outer edge and the strip being unsupported; the unsupported section of the belt sagging, whenever bulk materials transported on the belt accumulate against the scraper blade, thereby facilitating removal of said small fraction.

8. The system according to claim 7, which further comprises a high density rubber guard which covers the lower edge of the scraper blade, the belt slipping between the rubber guard and the plastic strip wherever the scraper blade presses the belt against the strip.

\* \* \* \* \*